United States Patent [19]
Kamakura et al.

[11] Patent Number: 6,076,101
[45] Date of Patent: Jun. 13, 2000

[54] ELECTRONIC MAIL PROCESSING SYSTEM WITH BONUS POINT TRACKING

[75] Inventors: Akira Kamakura, Kawasaki; Hideki Tanaka, Tokyo, both of Japan

[73] Assignee: Fujitsu Limited, Kawasaki, Japan

[21] Appl. No.: 08/911,063

[22] Filed: Aug. 14, 1997

[30] Foreign Application Priority Data

Sep. 12, 1996 [JP] Japan ................................. 8-241499

[51] Int. Cl.⁷ .................................................. G06F 7/00
[52] U.S. Cl. ............................... 709/206; 705/14; 705/17
[58] Field of Search ................................ 705/14, 17, 26, 705/27; 395/200.36, 200.47, 200.48, 200.79; 709/206

[56] References Cited

U.S. PATENT DOCUMENTS

| 5,493,692 | 2/1996 | Theimer et al. | 709/206 |
|---|---|---|---|
| 5,734,838 | 3/1998 | Robinson et al. | 705/14 |
| 5,774,870 | 6/1998 | Storey | 705/14 |
| 5,781,901 | 7/1998 | Kuzma | 705/14 |
| 5,794,210 | 8/1998 | Goldhaber et al. | 705/14 |

*Primary Examiner*—Dung C. Dinh
*Attorney, Agent, or Firm*—Staas & Halsey LLP

[57] ABSTRACT

An electronic mail processing system for distributing an e-mail message from a sender to recipients, which encourages the recipients to open, read, and reply to the e-mail message sent from the sender. An original e-mail message sent from a sender via a sender terminal is stored in an outgoing message storage unit. An outgoing mail information registration unit stores a list of recipients to whom the e-mail message should be delivered, as well as storing information on bonus points. A message sending unit encloses bonus point information in the e-mail message and distributes it to the recipients included on the list. Upon receipt of a reply message from one of the recipients, a reception process unit gives a predetermined number of bonus points to the recipient. Each recipient's bonus points are accumulated in a recipient information storage unit, and he/she can redeem his/her bonus points for gifts depending on the accumulated points. This structural arrangement encourages the recipients to open the sender's message and write reply messages thereto in expectation of the redeemable bonus points, thus allowing the original message sender to collect more reply messages from the recipients than normally expected.

11 Claims, 11 Drawing Sheets

31a OUTGOING MESSAGE

| ITEM | CONTENTS |
|---|---|
| JOB-ID | REFERENCE NUMBER OF OUTGOING E-MAIL MESSAGE |
| SUBJECT | TITLE OF E-MAIL MESSAGE |
| BODY | BODY OF E-MAIL MESSAGE |

FIG. 4

37a REDEMPTION NOTIFICATION DATA

| ITEM | CONTENTS |
|---|---|
| SENDER ID | IDENTIFICATION NO. OF NOTIFICATION MESSAGE |
| SENDER PW | PASSWORD OF NOTIFICATION MESSAGE |
| THRESHOLD LEVEL | THRESHOLD LEVEL FOR REDEMPTION NOTIFICATION |
| SUBJECT | TITLE OF NOTIFICATION MESSAGE |
| BODY | BODY OF NOTIFICATION MESSAGE |

FIG. 11

ELECTRONIC MAIL PROCESSING SYSTEM WITH BONUS POINT TRACKING

BACKGROUND OF THE INVENTION

1. Field of the Invention

The present invention relates to an electronic mail processing system, and more particularly, to an electronic mail processing system which encourages a recipient to open and reply to an electronic mail message delivered thereto.

2. Description of the Related Art

Electronic mail, or e-mail, is a personal communication tool that allows a person to send and receive messages over networks. Today, electronic mail delivery services are used in many network communities for the purpose of member-to-member communications via a local area network (LAN) or wider area networks such as the Internet. There are some network providers specialized in e-mail delivery services.

In certain types of e-mail delivery services, each user registers to the server topics that he/she is interested in, so that new information related to his/her interest is delivered to his/her mail box in the form of electronic mail. Assume here that one member of a certain special interest group has sent a message to the other members of the group. When the e-mail message reaches one's mail box, the recipient is notified by his/her computer of the arrival of the message. The recipient then runs a mailer application to open an e-mail message window, where he/she can see a message summary indicating who wrote the message, when it was posted, what the subject is, and whether it was read or remains unread. The recipient checks the sender's name and the subject line of the received e-mail message to determine whether it is worth reading or not, and if it looks interesting, the recipient will open the message to read the body text. Otherwise, the message may be disposed of or just left unread. Note that, from the standpoint of the message sender who transmitted the information with a specific intention, it may be of great concern whether or not his/her e-mail message is opened and read by the recipient, who is a registered member of the special interest group.

However, the recipient may not always read every message received. Rather, he/she can freely decide whether to open each incoming e-mail message, when, for example, it is a direct mail from a certain company. As such, while every sender sends e-mail, expecting all the recipients to open and read the message he/she has sent, recipients do not necessarily read all incoming messages. Since the system returns acknowledgment information to the sender, he/she can confirm whether or not the message was opened by the recipient as intended. However, even if the recipient did open the e-mail message, the sender has no way of knowing whether the recipient has really read the contents of the message until he/she receives a reply message from the recipient.

SUMMARY OF THE INVENTION

Taking the above into consideration, an object of the present invention is to provide an electronic mail processing system that encourages the recipients to open, read, and reply to the e-mail message from the sender.

To accomplish the above object, according to the present invention, there is provided an electronic mail processing system which controls delivery of an e-mail message from a sender to recipients. This electronic mail processing system comprises the following elements: (a) outgoing message storage means for holding the e-mail message from the sender; (b) outgoing mail information registration means for storing information on the recipients to whom the e-mail message should be delivered; (c) message sending means for enclosing bonus point information in the e-mail message held in the outgoing message storage means and sending the e-mail message having the bonus point information to the recipients who are registered in the outgoing mail information registration means; (d) message receiving means for receiving reply messages from the recipients; and (e) recipient information storage means for holding a bonus point account of each recipient and adding bonus points to the bonus point account according to the bonus point information, each time the message receiving means receives the reply message from the recipient.

The above and other objects, features and advantages of the present invention will become apparent from the following description when taken in conjunction with the accompanying drawings which illustrate a preferred embodiment of the present invention by way of example.

BRIEF DESCRIPTION OF THE DRAWINGS

FIG. 4 is a diagram showing a typical structure of an outgoing message;

FIG. 11 is a diagram showing a typical structure of redemption notification data.

DESCRIPTION OF THE PREFERRED EMBODIMENTS

First, the present invention is outlined below with reference to some of the accompanying drawings.

Figure 1:
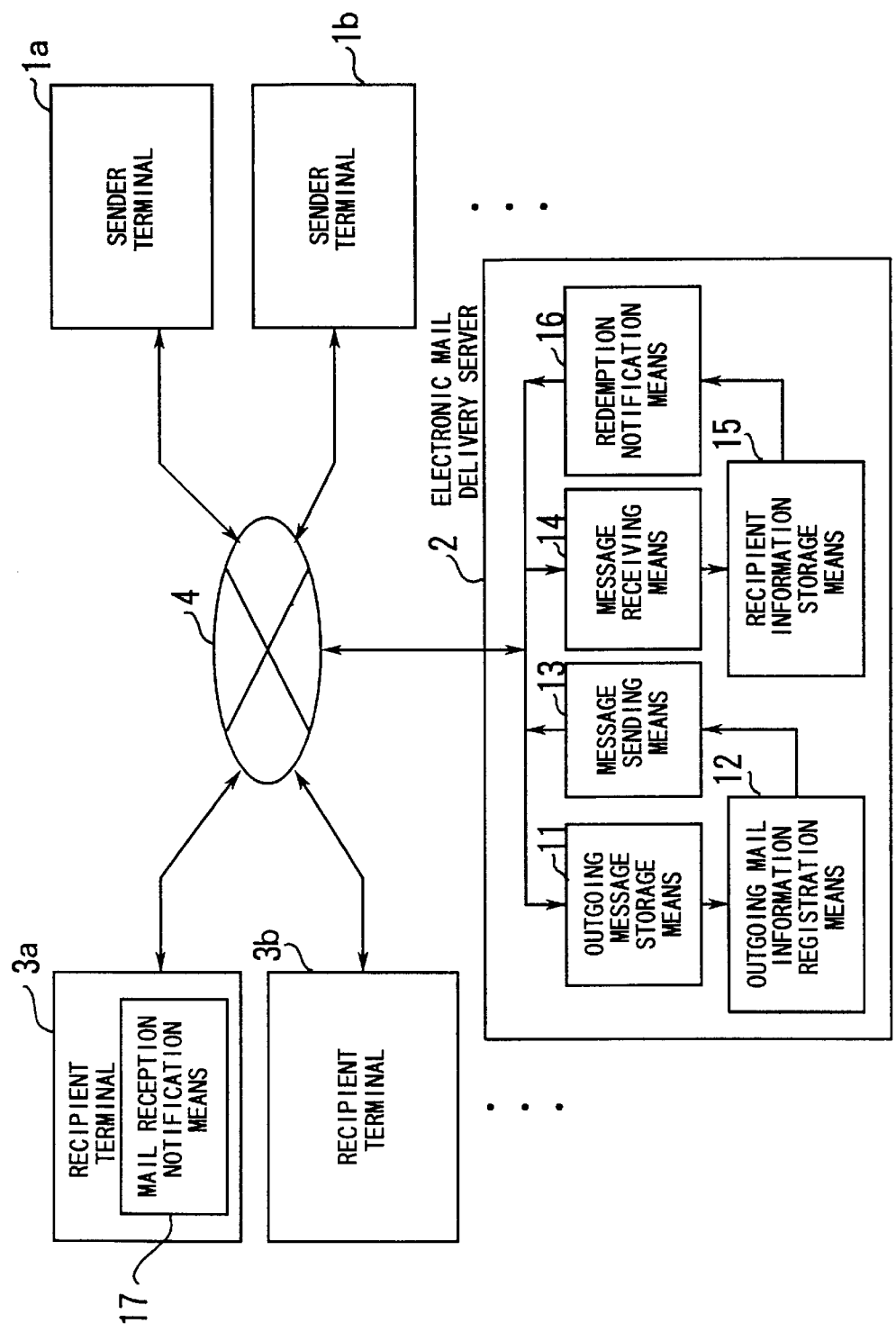
FIG. 1 is a block diagram showing the principle of an electronic mail processing system according to the present invention.

FIG. 1 is a block diagram showing the principle of an electronic mail processing system according to the present invention. The electronic mail processing system of the present invention is configured in a network environment that comprises a plurality of recipient terminals 3a, 3b, etc., at least one sender terminals 1a, 1b, etc., an electronic mail delivery server 2, and a network 4 interconnecting the above.

More specifically, this electronic mail processing system comprises the following main elements:

(a) outgoing message storage means 11 for holding an original e-mail message sent from a sender via a sender terminal 1a, 1b, or the like for distribution purposes;

(b) outgoing mail information registration means 12 for storing information on the recipients to whom the e-mail message should be delivered, as well as storing information on bonus points;

(c) message sending means 13 for enclosing bonus point information in the e-mail message and delivering the e-mail message having the bonus point information to the recipients;

(d) message receiving means 14 for receiving reply messages from the recipients;

(e) recipient information storage means 15, which holds a bonus point account of each recipient, for adding bonus points to the bonus point account of the recipient who responded to the original e-mail message;

(f) redemption notification means 16 for notifying the recipient, in response to his/her reply message, of the product or service for which the recipient can redeem his/her accumulated bonus points; and (g) mail reception notification means 17 for notifying the recipient of arrival of an e-mail message having bonus point information.

In the above-mentioned structural arrangement, the outgoing mail information registration means 12 stores information on the recipients who agreed beforehand to receive e-mail messages from a particular sender. It also stores bonus point accounts of those recipients. When an e-mail message is sent from the sender, the message is once stored into the outgoing message storage means 11. The message sending means 13 distributes the e-mail message stored in the outgoing message storage means 11 to the recipients registered in the outgoing mail information registration means 12. Here, each e-mail message is attached a piece of bonus point information.

When the e-mail message reaches the recipient terminals 3a, 3b, and so on, the mail reception notification means 17 displays the subject of the received message to indicate how many bonus points are attached thereto. This makes each recipient recognize that the received message is subject to reward, thus encouraging him/her to open the e-mail message.

Here, the recipient opens the e-mail message and confirms the content. If he/she makes a reply to the message, that reply message is received by the message receiving means 14 in the electronic mail delivery server 2. The message receiving means 14 analyzes the contents of the reply message and determines the bonus points to be given to the recipient. The determined bonus points, or earning points, are supplied to the recipient information storage means 15 and added to the recipient's bonus point account.

Meanwhile, the redemption notification means 16 monitors how many points are accumulated in each recipient's bonus point account in the recipient information storage means 15. When a certain recipient's accumulated points have reached a predetermined threshold level, the redemption notification means 16 sends an e-mail message to notify the recipient that he/she can redeem his/her points for some free gifts or services offered by the original message sender.

As described above, the recipients can easily recognize that the e-mail message received from the sender is subject to reward, and therefore, most recipients will open the e-mail message in expectation of the reward. Moreover, a higher probability of receiving replies is promised, because additional bonus points are awarded to the recipients only if they reply to the message.

Next, the following description will present a specific embodiment of the present invention by illustrating an e-mail delivery service system acting as an agent that allows client companies to distribute direct mail to consumers.

Figure 2:
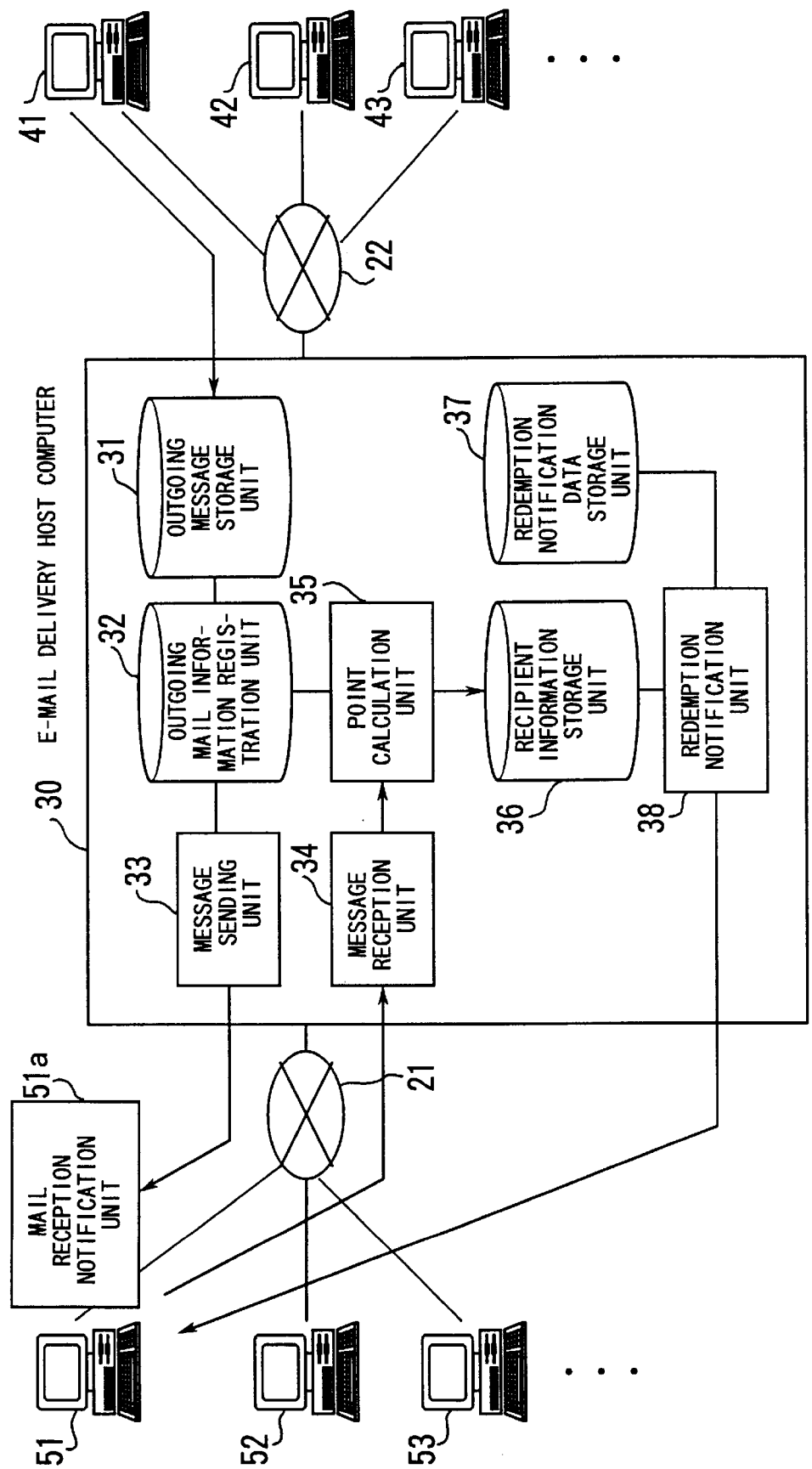
FIG. 2 is a diagram showing a configuration of an e-mail delivery service system where the electronic mail processing system of the present invention is implemented.

FIG. 2 shows a configuration of an e-mail delivery service system where the electronic mail processing system of the present invention is implemented. This e-mail delivery service system comprises an e-mail delivery host computer 30 connected with networks 21 and 22, client computers 41, 42, and 43 disposed at client companies who wish to distribute e-mail messages, and client computers 51, 52, and 53 owned by consumers who agree to receive the e-mail messages from the companies.

The e-mail delivery host computer 30 comprises the following functional units: an outgoing message storage unit 31, an outgoing mail information registration unit 32, a message sending unit 33, a message reception unit 34, a point calculation unit 35, a recipient information storage unit 36, a redemption notification data storage unit 37, and a redemption notification unit 38. The outgoing message storage unit 31 holds outgoing messages sent by the senders. Consumers subject to direct mail delivery and their respective point awarding conditions are registered in the outgoing mail information registration unit 32. The message sending unit 33 executes a process of distributing direct mail messages to the registered recipients. The message reception unit 34 accepts reply messages returned from the recipients. The point calculation unit 35 conducts a point awarding process according to the contents of the reply messages received. The recipient information storage unit 36 holds information on the bonus points of each recipient. The redemption notification data storage unit 37 holds information concerning the redemption of bonus points. The redemption notification unit 38 sends notification messages to the consumers of their redeemable bonus points.

Further, the recipient's client computer 51 is equipped with a mail reception notification unit 51a that notifies the consumer of the presence of incoming e-mail messages that have been delivered thereto. Similarly, the other client computers such as 52 and 53 are also equipped with a mail reception notification unit of the same kind.

In the above-described structural arrangement, the e-mail delivery host computer 30 has registration data about the companies (i.e., senders) which generate direct mail messages and the consumers who have agreed to receive direct mail from the registered senders. In addition, the consumers enroll their own profile information as well as the categories of topics that they are interested in, expecting that the e-mail messages they receive be qualified by the registered categories. The e-mail delivery host computer 30 accepts the original messages from the client companies, whose contents, however, may range over a wide variety of categories. The e-mail delivery host computer 30 checks the category of each message and delivers it only to such consumers who previously chose that category.

Next, the overall operation of this e-mail delivery service system will be explained below.

Figure 3:
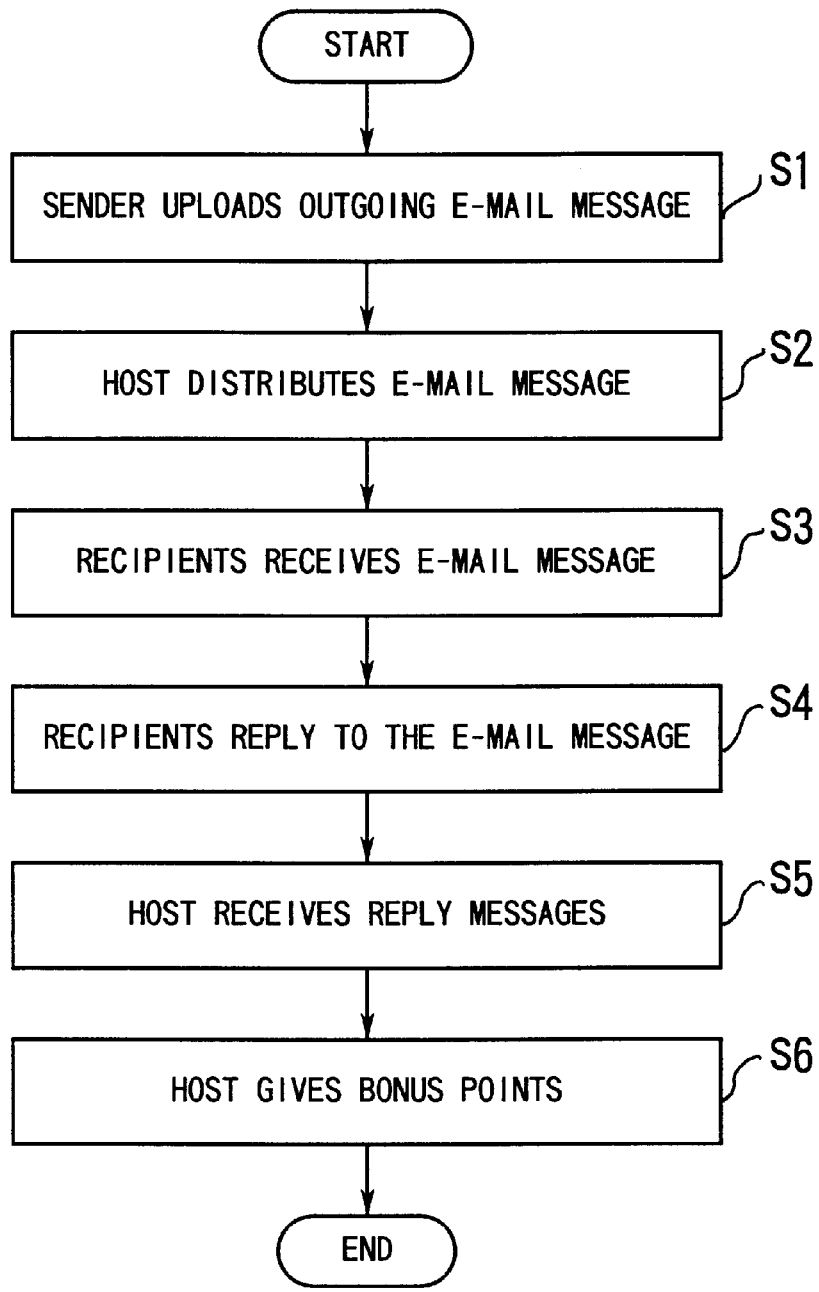
FIG. 3 is a flowchart showing an overall procedure executed by the e-mail delivery service system.

FIG. 3 is a flowchart showing an overall process of the e-mail delivery service system according to the present invention. It should be noted that this flowchart assumes that all recipients have finished the member enrollment to the e-mail delivery host computer 30, from which state the following steps begin.

[S1] First, the sender uploads an e-mail message to the e-mail delivery host computer 30 to register it as the original text of direct mail.

[S2] The e-mail delivery host computer 30 sends the registered e-mail message to the recipients who suit the delivery condition.

[S3] Each recipient receives the e-mail message sent from the e-mail delivery host computer 30.

[S4] After opening and reading the e-mail message, the recipient responds to it by sending a reply message.

[S5] The e-mail delivery host computer 30 receives the reply message.

[S6] The e-mail delivery host computer 30 gives bonus points to the recipient who replied thereto, thereby updating his bonus point account.

In step S1, the original e-mail message is registered as an outgoing message in the outgoing message storage unit 31 as part of the e-mail delivery host computer 30. The following description will focus on this outgoing message.

FIG. 4 shows a typical structure of an outgoing message 31a, which consists of the following three items: "JOB ID," "SUBJECT," and "BODY." "JOB ID" is a reference number assigned to the outgoing e-mail message, which is used by the e-mail delivery host computer 30 to distinguish individual direct mail messages. "SUBJECT" is a title of each direct mail message, while "BODY" is a body text of the message.

The e-mail delivery host computer 30 has an outgoing mail information table to hold a collection of mail addresses previously registered. A typical configuration of this table will now be described below.

Figure 5:
FIG. 5 is a diagram showing a typical structure of an outgoing mail information table.

FIG. 5 is a diagram showing a typical arrangement of an outgoing mail information table 32a, which is created in the outgoing mail information registration unit 32, one for every outgoing message 31a. The data items registered in this table 32a include "JOB ID," "SENDER ID," "SENDER PW," "RECIPIENT IDs" for individual recipients, and their respective "POINT AWARDING CONDITIONs" and "EARNING POINTs." Note that a pair of items "POINT AWARDING CONDITION" and "EARNING POINTS" are registered separately for each recipient.

More specifically, "JOB ID" is a reference number assigned to each original outgoing e-mail message, which is set to the same value as that affixed to the outgoing message 31a (see FIG. 4) so as to associate them with each other. "SENDER ID" and "SENDER PW" are the sender's e-mail address and password that are used when the e-mail delivery host computer 30 distributes the message to the registered recipients. "RECIPIENT IDs #1 to #N" are e-mail addresses of the individual registered recipients, where the integer N represents the number of such recipients. "POINT AWARDING CONDITIONs #1 to #N" are conditional expressions that define how to increase the recipients' bonus point accounts, while "EARNING POINTs #1 to #N" are the bonus point values that are awarded to the respective recipients.

There may be several different ways to define the point awarding conditions. In one method, some special symbols are embedded into each outgoing message, and if the symbol is included in a reply message from a recipient, the system gives predetermined earning points to the recipient, depending on the symbol in the reply message. More specifically, suppose that the message body includes the following instructions as:

"Put a symbol </1/> in your reply message if you cooperate with our survey by filling in the following questionnaire. Otherwise, put another symbol </2/> in your message."

Here, the recipients are requested to send a reply message with either symbol included in its body. The system determines the earning point value as ten points if the symbol "</1/>" is included in the reply message, while it gives five points if the symbol "</2/>" is included.

In another example, the system awards different earning point values to the recipients, depending on the volume of the reply messages. Specifically, the outgoing e-mail message may include the following request message as "We would appreciate hearing from you with your impression of our new product XYZ as much as possible."

In this case, the earning points is five points if the number of lines of a reply message is fewer than ten lines, but it is increased to ten points if the reply has ten or more lines.

In the way described above, it is possible to implement a wide variety of patterns of point awarding conditions and earning points on an individual message basis.

Next, the following description will be devoted to a process of distributing an e-mail message to multiple recipients, which is executed by the message sending unit 33 as part of the e-mail delivery host computer 30.

Figure 6:
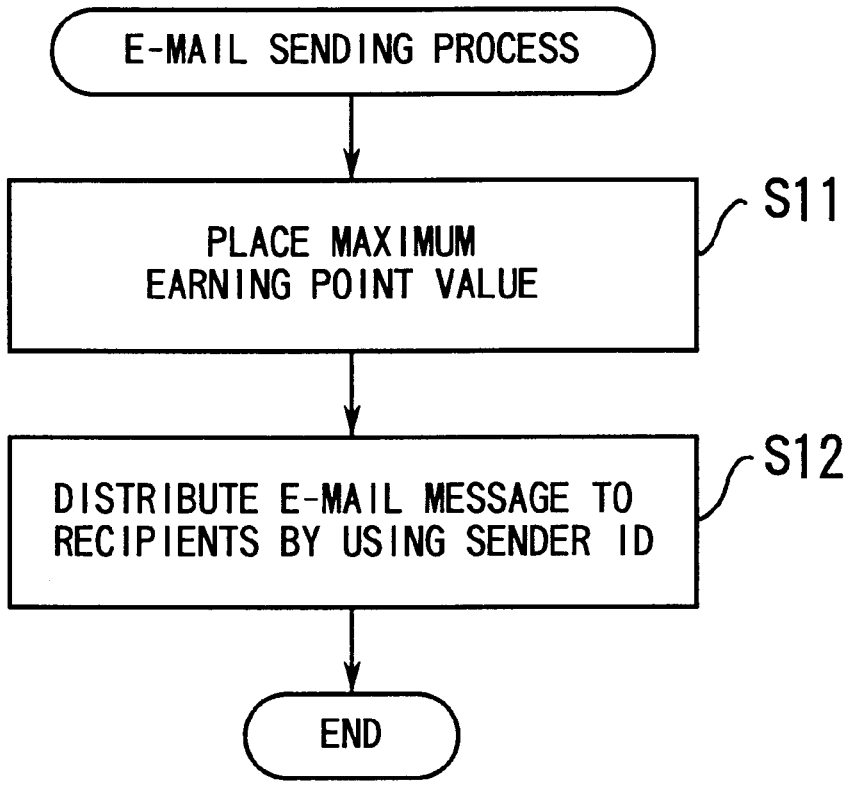
FIG. 6 is a flowchart showing a process of sending an e-mail message.

FIG. 6 is a flowchart showing a process of distributing an e-mail message. In short, the function of the message sending unit 33 is to enclose earning point information and to post the messages.

[S11] The message sending process starts with placing a maximum earning point value to the first part of the e-mail's subject line. This maximum earning point value is actually extracted from among those registered previously in the outgoing mail information table 32a as part of the outgoing mail information registration unit 32.

[S12] Next, using the "SENDER ID," the message sending unit 33 posts the e-mail message with the maximum earning point indication.

Figure 7:
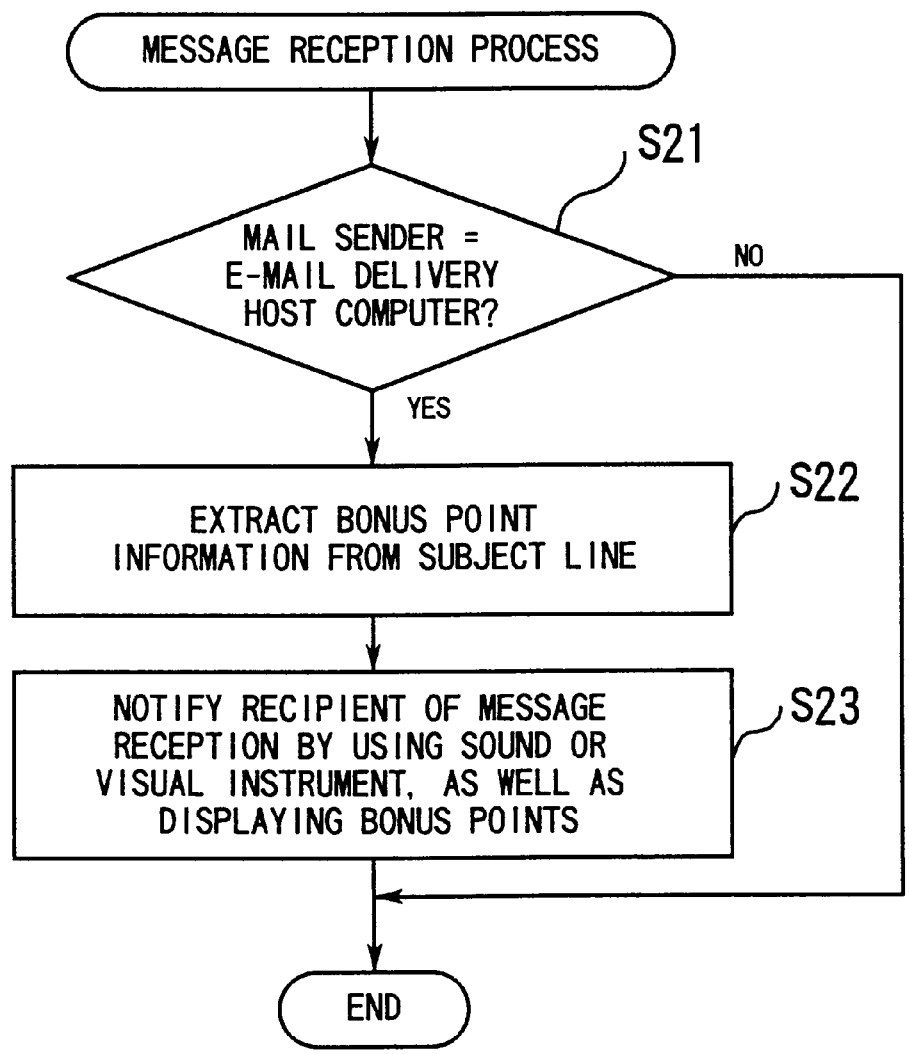
FIG. 7 is a flowchart showing a process of receiving an e-mail message.

Next, the following will present an e-mail reception process executed by the mail reception notification unit 51a in a recipient's client computer, say 51. FIG. 7 is a flowchart showing a process of receiving an e-mail message.

[S21] The e-mail reception process starts with checking where the message is from. More specifically, the mail reception notification unit 51a examines whether or not the message is delivered from the e-mail delivery host computer 30, which is working as an agent for the original sender of the direct mail. Actually, the mail reception notification unit 51a tests in this step whether the received e-mail message is a special message with a reward program or a normal message. If the e-mail message is not from the e-mail delivery host computer 30, the present e-mail reception process is simply terminated.

[S22] If the e-mail message is from the e-mail delivery host computer 30, the mail reception notification unit 51a extracts a numerical value of the bonus points from the head of the message's subject line.

[S23] Subsequently, the mail reception notification unit 51a informs the recipient of the reception of an e-mail message with a reward option. Here, the recipient can be notified of the new mail by using one of the following methods to call the recipient's attention: an alert dialog that appears on the terminal screen by interrupting the present application, a special sound, or an animation of, say, a mailbox icon. This notification of new mail is accompanied by an indication of the earning points, or the bonus points that the recipient is to honor.

In a simple example, the mail reception notification unit 51a acquires the subject line out of the received e-mail message and displays it as is. In this case, the mail reception notification unit 51a does not acquire the present earning point value. However, since the bonus point values is indicated in the head of the subject line, it will naturally be seen on the screen by simply displaying the subject line as it is. Thus, the recipient can easily recognize the redeemable bonus points, as well as recognizing the arrival of a new e-mail message.

Next, a point awarding process will be explained below. This process is executed by the message reception unit 34 and point calculation unit 35, as part of the e-mail delivery host computer 30, in response to a reply from the recipient.

Figure 8:
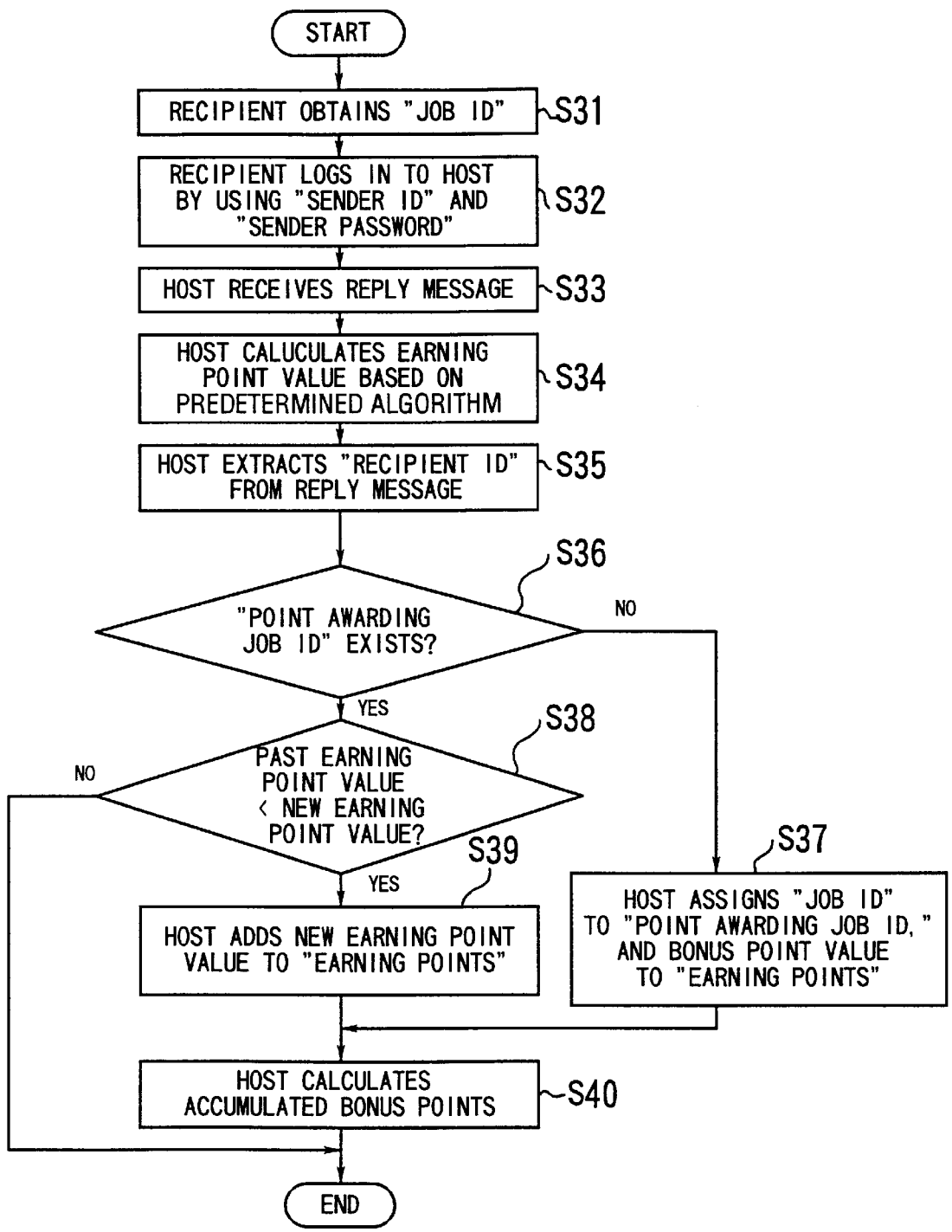
FIG. 8 is a flowchart showing a point awarding process.

FIG. 8 is a flowchart showing this point awarding process. In this process, the point calculation unit 35 refers to the aforementioned outgoing mail information table 32a (FIG. 5) as well as to a recipient information table in the recipient information storage unit 36. The recipient information table, in short, stores some recipient-specific parameters such as "RECIPIENT ID (recipient's ID number)," "E-MAIL ADDRESS (recipient's mail address)," "ACCUMULATED POINTS (total bonus points)," "POINT AWARDING JOB ID (identifier of each e-mail delivery service)," "EARNING POINTS (bonus points gained)." The details of those will be described later with reference to FIG. 9.

[S31] First, the recipient obtains a direct mail identification number "JOB ID" affixed to the e-mail message. Here, the recipient also acquires the "SENDER ID" (i.e., the sender's e-mail address) and "SENDER PW" (i.e., the sender's password) which were added by the e-mail delivery host computer 30 when it sent this direct mail message.

[S32] The recipient logs in to the e-mail delivery host computer 30 by using "SENDER ID" and "SENDER PW" when it sends the reply message back to the e-mail delivery host computer 30.

[S33] The message reception unit 34 in the e-mail delivery host computer 30 receives the reply message from the recipient.

[S34] The point calculation unit 35 then calculates the bonus point value concerning the reply message, based on a predetermined algorithm. Assume here that the point calculation unit 35 uses the aforementioned point calculation method where it gives different earning points to the recipients according to the volume of their reply messages. In this case, the earning points are five points, for instance, if the reply message is less than ten lines. It is determined to be ten points if the reply has ten or more lines.

[S35] The point calculation unit 35 then extracts "RECIPIENT ID" from the recipient's e-mail address.

[S36] Referring to the recipient information storage unit 36, the point calculation unit 35 examines whether the received reply message is the very first reply from the recipient or not. More specifically, when a reply to the direct mail with "JOB ID" is received, the value of the "JOB ID" is set to a parameter "POINT AWARDING JOB ID" as part of the recipient information table relevant to the recipient who made the reply to the direct mail message. The point calculation unit 35 searches the recipient information table in the recipient information storage unit 36 for the corresponding "POINT AWARDING JOB ID" in accordance with the "JOB ID" each time it receives a new reply message. If it fails to find such "POINT AWARDING JOB ID," the point calculation unit 35 determines that the present reply is the very first reply to the direct mail with the "JOB ID." If, in turn, the corresponding "POINT AWARDING JOB ID" is found, it learns that some bonus points were given to his/her account before.

[S37] If the received message is ascertained to be the first reply from the recipient concerning the direct mail in process, the point calculation unit 35 updates the recipient information table by newly registering the parameter "POINT AWARDING JOB ID" and assigning the earning point value calculated in step S34 to the parameter "EARNING POINTS."

[S38] If the received reply is determined in step S36 as not being the first reply, the point calculation unit 35 then compares the stored value of "EARNING POINTS" corresponding to the present "POINT AWARDING JOB ID" with the new earning point value calculated in step S34 at this time. Here, if the past earning point value recorded in the parameter "EARNING POINTS" is larger than the new earning point value, the point calculation unit 35 rejects the reply message as being invalid, and terminates the process without updating the recipient's bonus point account.

Therefore, even if a certain recipient attempted to send many reply messages to earn more bonus points, it would only end up in vain as long as the contents of the messages are the same. The system rejects such fraud messages in this step S38, thus preventing the bonus points from being added two or more times erroneously.

[S39] Since it is determined in step S38 that the new earning point value calculated at this time is larger than the past earning point value recorded, the point calculation unit 35 now understands that it has received a valid reply message that is worth adding the bonus points. Then it updates the past earning point value "EARNING POINTS" with the new earning point value calculated in step S34 plus the past earning point value, which means an increase in the balance of the recipient's bonus point account.

[S40] Lastly, the point calculation unit 35 sums up all "EARNING POINTS" values in the recipient information table of the recipient information storage unit 36, and enters the total bonus points to the parameter "ACCUMULATED POINTS" in the same table.

In the present invention, the recipient information table stored in the recipient information storage unit 36 is configured as follows.

Figure 9:
FIG. 9 is a diagram showing a typical structure of recipient information.

FIG. 9 shows a typical configuration of a recipient information table 36a, which includes the following parameters: "RECIPIENT ID," "E-MAIL ADDRESS," "ACCUMULATED POINTS," "POINT AWARDING JOB ID," and "EARNING POINTS." This recipient information table 36a is generated and registered separately for each recipient.

More specifically, "RECIPIENT ID" is each recipient's reference number for identification purposes, and "E-MAIL ADDRESS" is his/her e-mail address. "ACCUMULATED POINTS" shows a balance of his/her bonus point account. Further, "POINT AWARDING JOB ID" and "EARNING POINTS" are defined each time a new direct mail delivery job is executed. The "POINT AWARDING JOB ID" is created as a copy of the JOB ID when the system executes a process of adding bonus points for the first time of each job, while the "EARNING POINTS" shows a bonus point value that the recipient is awarded in that process. Incidentally, the "ACCUMULATED POINTS" may not necessarily be an independent item in the recipient information table 36a but calculated each time its value is needed. This is because the "ACCUMULATED POINTS" value is simply the sum of the values of "EARNING POINTS #1 to #M" contained in the recipient information table 36a, where M is an integer representing the number of direct mail delivery jobs executed so far.

To understand more about the "POINT AWARDING JOB ID" and "EARNING POINTS," assume that the system is now handling a first direct mail message and the recipient information table 36a has an entry of "POINT AWARDING JOB ID #1" corresponding to that direct mail delivery job. The initial value of "EARNING POINT #1" is, of course, set to "zero" before bonus points are given to the recipient involved. Suppose that five points were entered to the "EARNING POINT #1" in response to the first reply message from the recipient to the e-mail delivery host computer 30. Then assume that the recipient sent the same reply message again with respect to the same direct mail. The earning point value is calculated to be five points but, since this earning point value is the same value as the previous earning point value recorded in the parameter "EARNING POINT #1", no points will be added at this time. In contrast to this, if the second reply is awarded a larger value (say, ten points), compared with the previous five points, then the parameter "EARNING POINT #1" will gain this additional ten points and thus become fifteen points in total.

In this way, the "ACCUMULATED POINTS" in recipient information table 36a held in the recipient information storage unit 36 gradually increases if the recipient replies to every incoming direct mail message. The recipient can redeem his/her bonus points for some gifts in accordance with the score. The next few paragraphs explain how this redemption of bonus points will be promoted by an automatic notification process implemented in the redemption notification unit 38.

Figure 10:
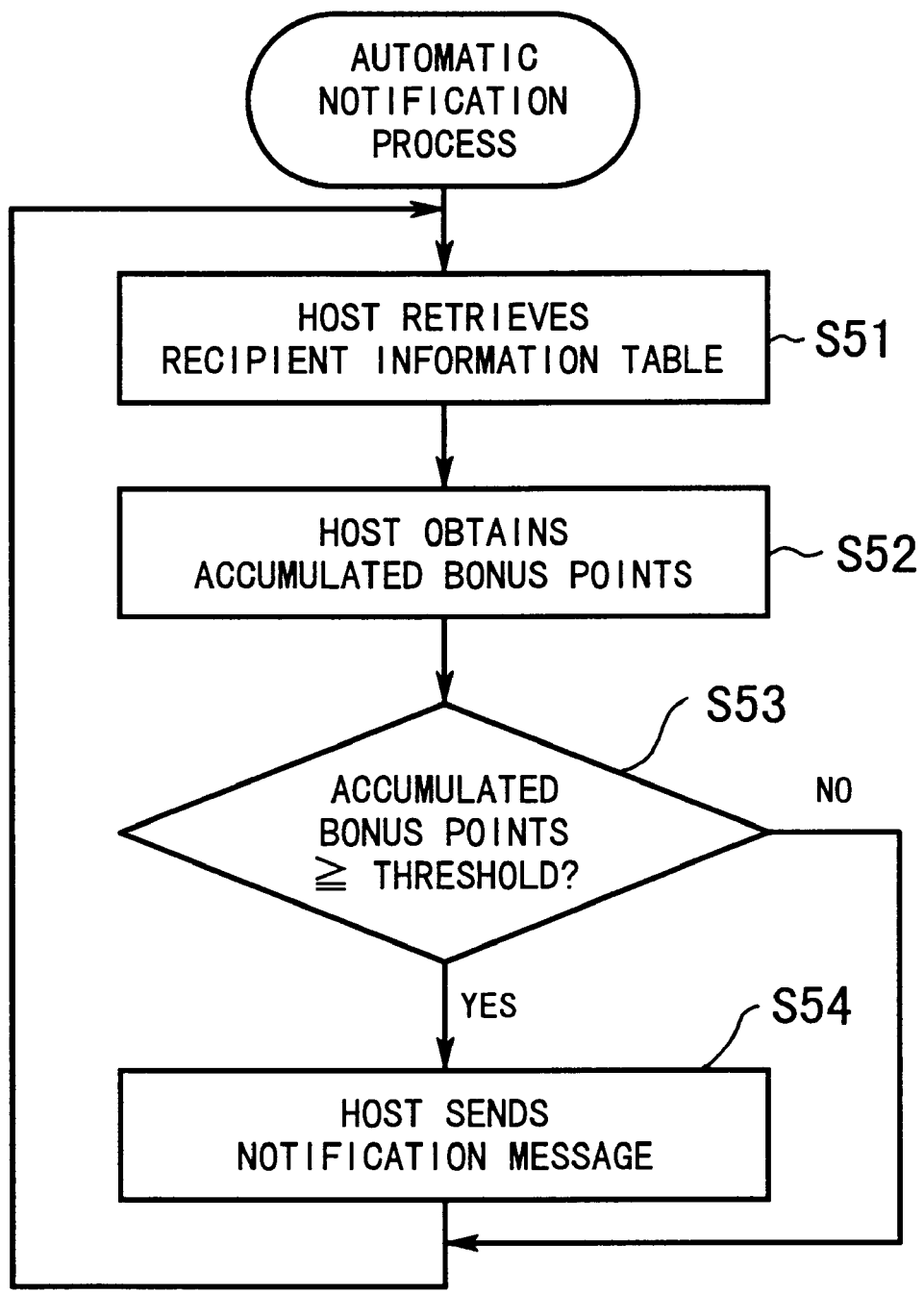
FIG. 10 is a flowchart showing an automatic notification process to invite a recipient to redeem his/her bonus points.

FIG. 10 is a flowchart showing an automatic notification process to invite a recipient to redeem his/her bonus points.

[S51] First, the redemption notification unit 38 extracts one recipient information table 36a including a certain "RECIPIENT ID," out of those held in the recipient information storage unit 36.

[S52] The redemption notification unit 38 obtains the value of "ACCUMULATED POINTS" from the extracted recipient information table 36a.

[S53] Referring to the redemption notification data held in the redemption notification data storage unit 37, the redemption notification unit 38 determines whether or not the recipient's accumulated points have already reached the threshold level for reward notification.

[S54] If the accumulated points have reached the threshold level, the notification message is sent to the recipient to let him/her know what kind of gifts or services he/she can receive in exchange for the present bonus points. After sending the notification e-mail message or when it is determined that the accumulated points does not reach the threshold level for redemption notification, the redemption notification unit 38 returns to step S51 and continues the process for another recipient information table for the next recipient.

In the way described above, the redemption notification unit 38 examines all the recipient information tables, and if there is any recipient whose accumulated points have reached a predetermined threshold level for redemption notification, it automatically transmits a notification message to invite him/her to redeem the bonus points for some gifts or services. Preferably, this automatic notification process will be invoked by an operation of updating a recipient information table 36a in the recipient information storage unit 36, and will be terminated when all the recipient information tables have been scanned.

Lastly, a configuration of redemption notification data held in the redemption notification data storage unit 37 will be explained below.

FIG. 11 shows a typical configuration of redemption notification data. This redemption notification data 37a comprises the following data items: "SENDER ID," "SENDER PW," "THRESHOLD LEVEL," "SUBJECT," and "BODY," where ID and PW are acronyms for identifier and password, respectively. The parameter "THRESHOLD LEVEL" is the number of bonus points that enables the recipient to be notified of the redemption, which value should be compared with the accumulated points when the redemption notification unit 38 determines whether to send notification mail (see S53 of FIG. 10). "SUBJECT" is a subject line as part of the head of each notification message, while "BODY" is the body text of the notification message describing the specification of products and services to be redeemed for. "SENDER ID" and "SENDER PW" are an identification number and a password, respectively, which are required when sending notification messages to recipients.

The above discussion is summarized as follows. According to the present invention, the electronic mail processing system encloses bonus point information to an outgoing message registered by the original sender, and distributes it to a plurality of recipients who were previously enrolled to the system. When a reply message returns from a recipient, the system adds some bonus points to the recipient's bonus point account. Therefore, the recipients can easily recognize that the received message is an e-mail message with redeemable bonus points. The bonus points serve as a good incentive that makes them willingly open the message. Actually, since the recipients are rewarded with those bonus points only when they have replied to the e-mail message, the original sender can expect the reply messages to return at a higher probability. Through this process, the original sender can successfully make access to the recipients and achieve firm communication with them.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. An electronic mail processing system which controls delivery of an e-mail message sent by a sender to a plurality of recipients, comprising:

outgoing message storage means for storing the e-mail message sent by the sender;

outgoing mail information registration means for storing information corresponding to which recipients of the plurality of recipients the e-mail message should be delivered;

message sending means for enclosing bonus point information in the e-mail message stored in said outgoing message storage means and sending the e-mail message having the bonus point information to a registered recipient of the plurality of recipients who is registered in said outgoing mail information registration means, the bonus point information indicating that bonus points will be awarded to the registered recipient if the registered recipient responds to the e-mail message;

message receiving means for receiving a reply message sent by the registered recipient in response to the e-mail message sent by said message sending means, and analyzing the reply e-mail message to determine bonus points to be awarded to the registered recipient; and recipient information storage means, coupled to said message receiving means, for holding a bonus point account of each recipient and adding the determined bonus points to the bonus point account of the registered recipient that sent the reply message, wherein said message receiving means further comprises:

reply count evaluation means, responsive to the reply message sent from the registered recipient, for determining whether the reply message is an initial reply message from the registered recipient by referring to recipient-specific information stored in said recipient information storage means;

bonus point comparison means, activated in response to said reply count evaluation means determining that the reply message is not an initial reply message, for comparing a bonus point earning value that was previously given to the registered recipient with a new bonus point earning value calculated with respect to the reply message; and point accounting means for adding the new bonus point earning value to a bonus point account of the registered recipient when the reply message is the initial reply message or when the new bonus point earning value is larger than the previously given bonus point earning value.

2. The electronic mail processing system according to claim 1, further comprising:

mail reception notification means, disposed in a terminal of each of the plurality of recipients, for displaying an earning point value extracted from said bonus point information, together with subject line information of the e-mail message sent by said message sending means.

3. The electronic mail processing system according to claim 2, wherein said mail reception notification means further comprises:

reward-offered mail notification means for extracting an e-mail message having the bonus point information by examining a sender name and a subject line of the e-mail message sent by said message sending means and notifying the registered recipient of receipt of the e-mail message having the bonus point information.

4. The electronic mail processing system according to claim 3, wherein said reward-offered mail notification means detects the receipt of the e-mail message having the bonus point information and notifies the registered recipient of the receipt of the e-mail message by invoking a dialog, a sound, or an animation.

5. The electronic mail processing system according to claim 1, wherein said message receiving means analyzes contents of the reply message sent from the registered recipient and varies an earning point value according to a volume of the reply message.

6. The electronic mail processing system according to claim 1, wherein said message receiving means analyzes contents of the reply message sent from the registered recipient and varies an earning point value according to presence of a previously designated symbol.

7. The electronic mail processing system according to claim 1, wherein the e-mail message sent by said message sending means contains a questionnaire for the registered recipient; and the reply message sent by the registered recipient includes an answer to the questionnaire.

8. The electronic mail processing system according to claim 1, further comprising:

redemption notification means, activated when the bonus points accumulated in the registered recipient's bonus point account stored in said recipient information storage means have reached a predetermined value, for notifying the registered recipient of a product or a service that the registered recipient can exchange for the accumulated bonus points.

9. An electronic mail processing system which processes an e-mail message sent by a sender to a recipient, comprising:

means for delivering the e-mail message from the sender to the recipient;

means for giving bonus points to the recipient in response to the recipient opening the e-mail message delivered thereto and replying to the e-mail message by returning a reply message to the sender;

message receiving means for receiving the reply message sent by the recipient in response to the e-mail message delivered by the means for delivering, and analyzing, the reply e-mail message to determine the bonus points to be given to the recipient; and recipient information storage means, coupled to said message receiving means, for holding a bonus point account of each recipient and adding the determined bonus points to the bonus point account of the recipient that sent the reply message;

wherein the message receiving means further comprises, reply count evaluation means, responsive to the reply message sent from the recipient, for determining whether the reply message is an initial reply message from the recipient by referring to recipient-specific information stored in said recipient information storage means;

bonus point comparison means, activated in response to said reply count evaluation means determining that the reply message is not an initial reply message, for comparing a bonus point earning value that was previously given to the registered recipient with a new bonus point earning value calculated with respect to the reply message; and point accounting means for adding the new bonus point earning value to a bonus point account of the registered recipient when the reply message is the initial reply message or when the new bonus point earning value is larger than the previously given bonus point earning value.

10. An electronic delivery device that sends an electronic message having deliver conditions corresponding to recipients registered to receive messages, comprising:

a message sending unit to attach bonus point information to the message and send the message to a recipient of the recipients registered to receive messages that satisfy the delivery conditions;

a message reception notification unit to receive the message sent, extract the bonus information, and notify the recipient satisfying the delivery conditions of receipt of the message, the receipt notification including the bonus information; and a point calculation unit to calculate a bonus point value corresponding to a response to the message sent by the notified registered recipient.

11. An electronic mail processing system comprising:

means for identifying a recipient registered to receive a particular message and storing bonus points accumulated by the registered recipient;

means for attaching bonus point information and sending the particular message to the registered recipient so that the registered recipient is notified of the bonus point information upon receipt of and prior to opening of the particular message;

means for receiving a reply message from the registered recipient, determining a number of bonus points awarded in response to the reply message and adding the determined number of bonus points to the stored accumulated points;

recipient information storage means, coupled to said means for receiving, for holding a bonus point account of each recipient and adding the determined bonus points to the bonus point account of the recipient that sent the reply message;

wherein the means for receiving further comprises, reply count evaluation means, responsive to the reply message sent from the registered recipient, for determining whether the reply message is an initial reply message from the registered recipient by referring to recipient-specific information stored in said recipient information storage means;

bonus point comparison means, activated in response to said reply count evaluation means determining that the reply message is not an initial reply message, for comparing a bonus point earning value that was previously given to the registered recipient with a new bonus point earning value calculated with respect to the reply message; and point accounting means for adding the new bonus point earning value to a bonus point account of the registered recipient when the reply message is the initial reply message or when the new bonus point earning value is larger than the previously given bonus point earning value.

\* \* \* \* \*